May 18, 1943.  W. R. SCHARSCH  2,319,561
FOOD COOKING UNIT
Filed May 13, 1941   4 Sheets-Sheet 2
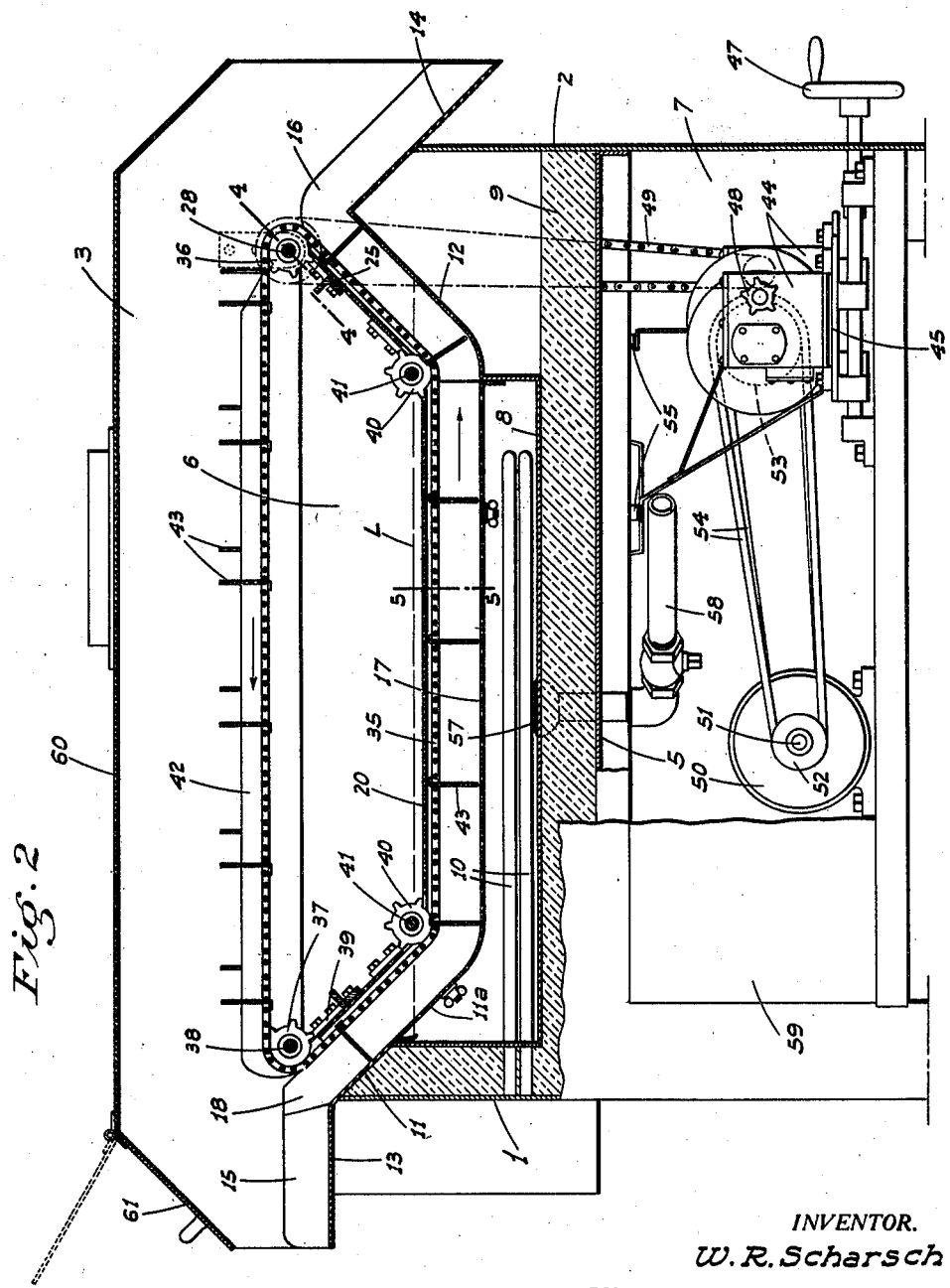
INVENTOR.
W. R. Scharsch
BY
ATTORNEYS May 18, 1943. W. R. SCHARSCH 2,319,561
FOOD COOKING UNIT
Filed May 13, 1941 4 Sheets-Sheet 3
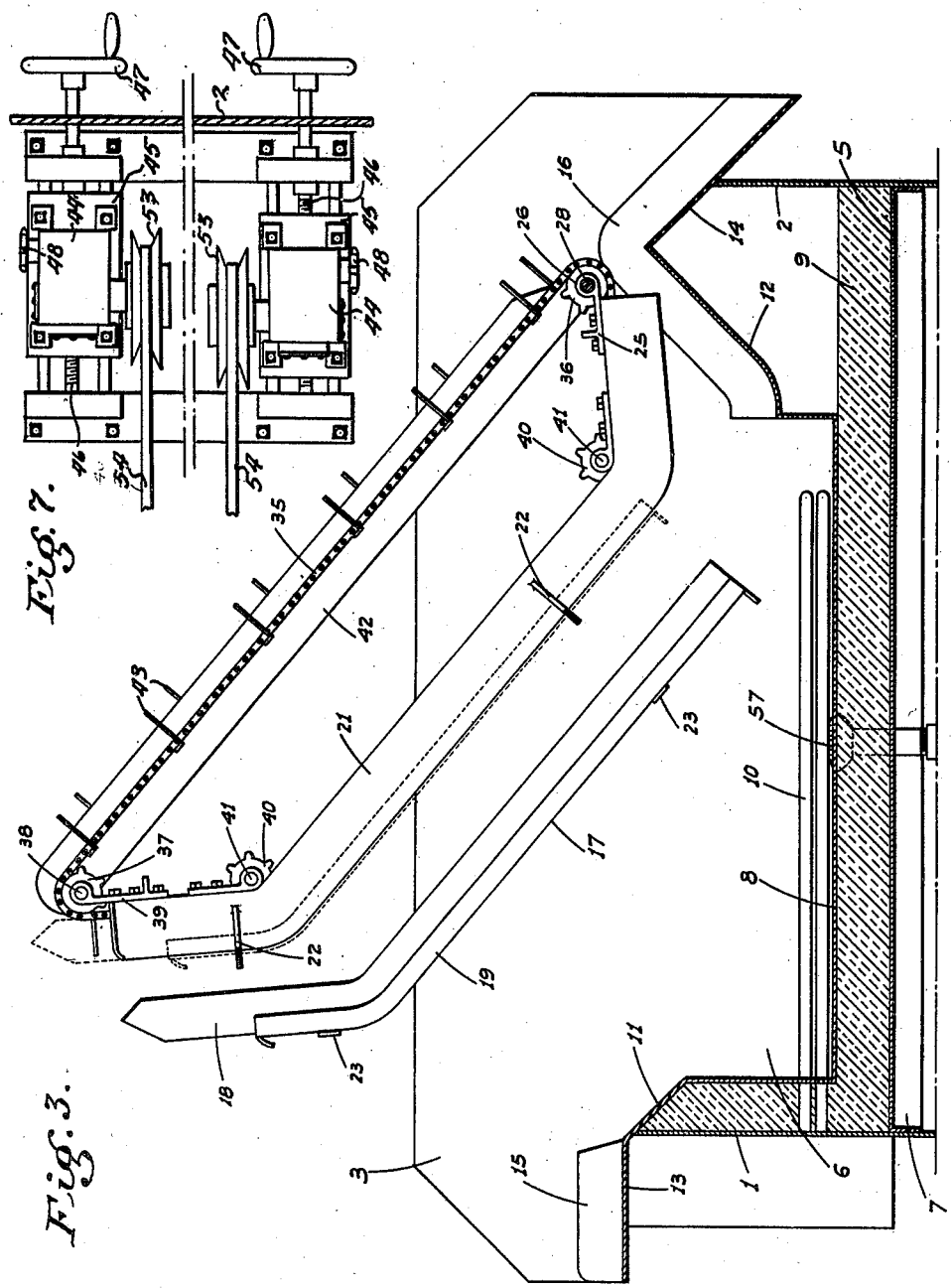
INVENTOR.
W. R. Scharsch
BY
ATTORNEYS May 18, 1943. W. R. SCHARSCH 2,319,561
FOOD COOKING UNIT
Filed May 13, 1941 4 Sheets-Sheet 4
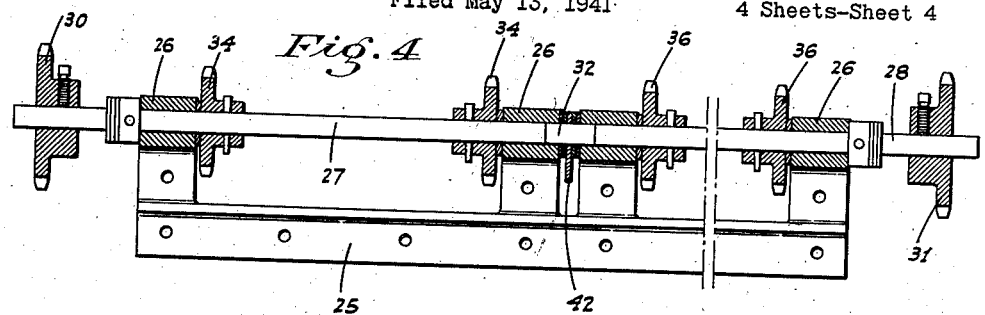
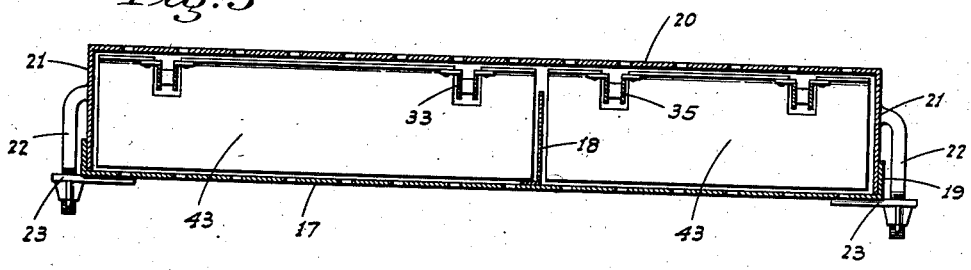
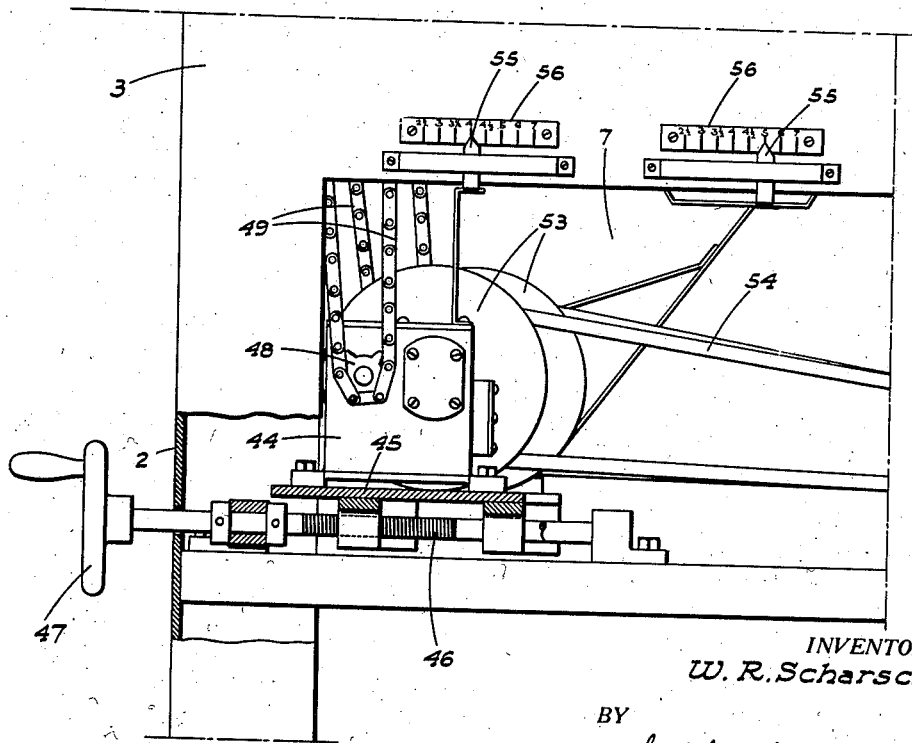
INVENTOR.
W. R. Scharsch
BY
Webster & Webster
ATTORNEYS Patented May 18, 1943

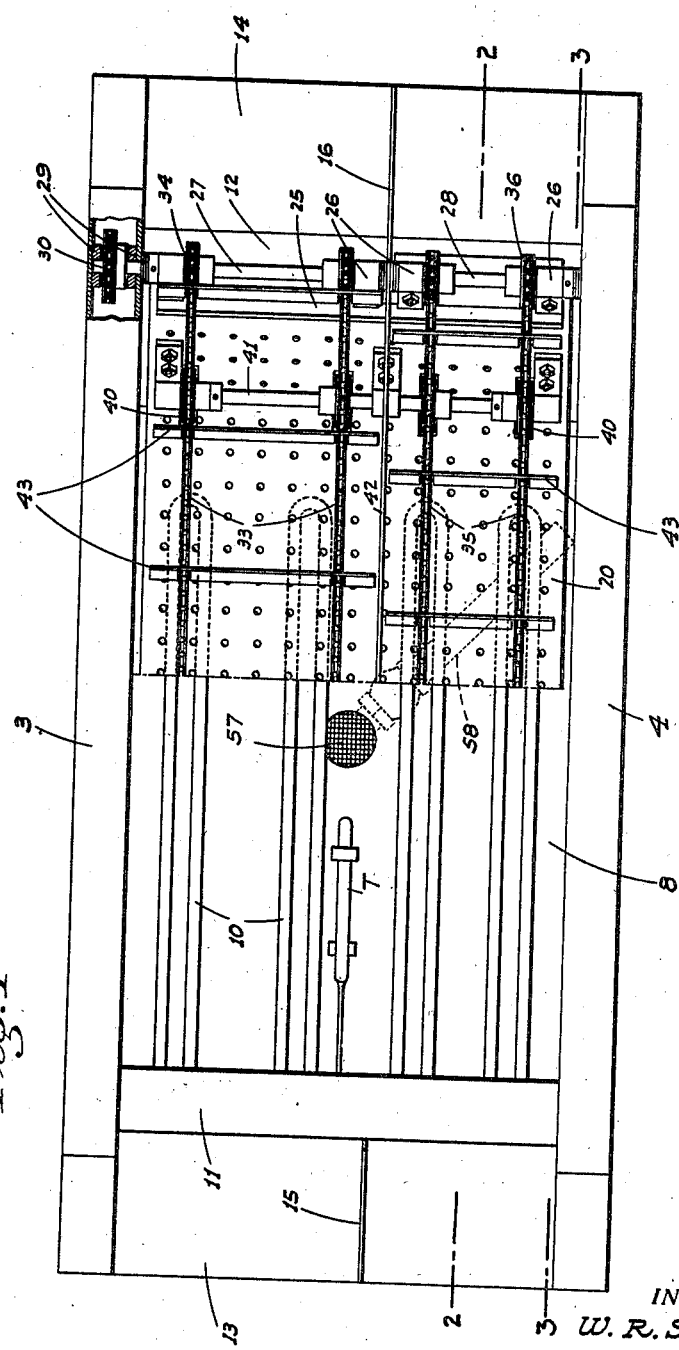

2,319,561

UNITED STATES PATENT OFFICE 2,319,561

FOOD COOKING UNIT

Walter R. Scharsch, Stockton, Calif., assignor to Cogrisch Products, Inc., a corporation of California Application May 13, 1941, Serial No. 393,176

9 Claims. (Cl. 53—7)

This invention relates in general to food cooking apparatus and in particular the invention is directed to, and it is the principal object to provide improvements in commercial type continuous cooker units, especially for deep fat frying, wherein the food to be cooked is manually fed into the apparatus, passed through the cooking medium by a conveyor assembly, and automatically discharged after cooking.

In apparatus of this type, the food conveying mechanism which passes through the deep fat must be cleaned regularly, and it is an object of this invention to construct and mount such conveying mechanism so that it may be readily shifted away from the grease tank or trough as a unit and to a position where the cleansing operation can be accomplished with comparative ease.

A further object of the invention is to provide a continuous deep fat cooker which includes in combination with a single cooking tank, a pair of separated conveyor mechanisms adapted to convey different foods through such tank simultaneously, but at independently regulated speeds so that the cooking time for each food may be accurately gauged; the apparatus including unique manually controlled means to alter or regulate the speed of such separate conveyor mechanisms.

An additional object of the invention is to provide a continuous cooker which includes a pair of separated conveyor mechanisms operative in a single cooking tank, a divided platform at the feed end of the apparatus from which different foods are fed into respective ones of the conveyor mechanisms without intermingling, and a correspondingly divided discharge chute into which the cooked foods are automatically discharged in separated relation.

It is also an object to provide a continuous, deep fat cooker which is simplified in construction, relatively inexpensive to construct, readily maintained in condition, and exceedingly effective for the purposes for which it is designed.

In the drawings similar characters of reference indicate corresponding parts in the several views:

Figure 1 is a top plan of the apparatus with the lid removed and the pan or cooking tunnel partly broken away.

Figure 2 is a sectional elevation on line 2—2 of Fig. 1.

Figure 3 is a sectional elevation on line 3—3 of Fig. 1, showing the unitary assembly of cooking tunnel and conveyor mechanism as partly raised for cleaning and with the bottom detached.

Figure 4 is an enlarged fragmentary sectional plan on line 4—4 of Fig. 2

Figure 5 is an enlarged cross section of the assembly of cooking tunnel and conveyor mechanism, taken on line 5—5 of Fig. 2.

Figure 6 is an enlarged fragmentary elevation, partly in section, of the conveyor speed controls and indicator units.

Figure 7 is a fragmentary plan view showing the dual gear box and drive arrangement.

Referring now more particularly to the characters of reference on the drawings, the apparatus comprises an upstanding housing which is substantially rectangular and elongated in plan; the housing being made up of end walls 1 and 2, and side walls 3 and 4, the latter extending upward some distance above the end walls. A horizontal division plate or partition 5 separates the housing into an upper compartment 6 and a lower compartment 7; the side walls 3 and 4, and end wall 1 being insulated above the plane of said partition.

An initially open topped tank or reservoir 8 is formed in upper compartment 6; the inner face plates of side walls 3 and 4 and end wall 1 forming corresponding portions of the tank. A layer of insulation 9 is disposed between the bottom of the reservoir 8 and horizontal plate 5. Electric heating units, preferably those sold under the trade name "Calrod," are disposed in the bottom of tank 8 and are connected with a suitable thermostatic control T which is interposed in circuit between the units and source of current.

The ends of the tank 8 some distance above the bottom thereof are formed with upwardly and outwardly inclined portions 11 and 12 respectively; the portion 12 having an inception somewhat lower, and being considerably longer, than portion 11. The portions 11 and 12 will hereafter be referred to as the feed incline and drain incline respectively. The upper edges of these inclines are in substantially the same horizontal plane; the feed incline 11 merging at the top with a horizontal platform 13 extending between side walls 3 and 4, while the drain incline 12 merges at the top with a discharge chute 14 extending between walls 3 and 4 at a downward and outward slope. An upstanding division plate 15 extends longitudinally between the sides of platform 13, and a corresponding upstanding division plate 16 is mounted on and extends the full length of drain incline 12 and chute 14 in symmetrical relation thereto.

The pivotally mounted cooking tunnel or pan and conveyor mechanism which is cooperatively arranged with tank 8 comprises the following:

A perforate and removable bottom pan 17 of substantially the width of the tank normally extends from the lower edge of feed incline 11 at a downward slope, to form a complementary incline 11a, and thence horizontally to the lower edge of drain incline 12. A continuous or unbroken bed is thus formed by said inclines and the pan bottom extending therebetween; the inclines being substantially the same length and at the same but of course opposed angles. It is over this continuous bed or surface that the food travels between feed platform 13 and discharge chute 14. An upstanding division plate 18 is mounted on and extends lengthwise of bottom pan 17 in symmetrical relation, said plate 18 corresponding to and being of sufficient length to normally abut the adjacent ends of plates 15 and 16. The bottom pan is flanged upward along its side edges, as at 19.

A sheet metal pan cover 20, perforate throughout its length, extends in overlying relation to the continuous bed formed by bottom pan 17 and the feed and drain inclines, and is spaced thereabove in parallel or symmetrical relation to form the top of the cooking tunnel. Side plates 21 are formed on the pan cover 20 along its edges and for its full length, depending therefrom to the continuous bed, thus completing the tunnel which remains open at its ends. The side plates extend to bottom pan 17 inside of flanges 19; the bottom pan being removably secured to the side plates 21 by means of draw bolts 22 mounted on the outside of the side plates and projecting through lateral ears 23 on the bottom pan.

The pan cover 20 at the end which is adjacent but in a plane above chute 14 is secured to a transverse bracket 25 which includes a plurality of transversely spaced bearings 26 which support separate drive shafts 27 and 28 in alined but spaced relation; the outer end portions of said shafts projecting into and being suitably journaled as at 29 in the side walls 3 and 4 of the housing. Sprockets 30 and 31 respectively are fixed on shafts 27 and 28 within walls 3 and 4, and are driven in the manner hereinafter described. A short section of shaft 32 is engaged between the adjacent ends of shafts 27 and 28, said section at its ends extending into closely spaced ones of the bearings 26.

A pair of endless chain conveyor assmblies, one being somewhat wider than the other, are operatively arranged with the cooking tunnel and are driven from shafts 27 and 28; one conveyor assembly including a pair of endless chains 33 engaging about transversely spaced drive sprockets 34 on shaft 27, while the other conveyor assembly includes endless chains 35 driven from transversely spaced sprockets 36 on shaft 28. The endless chains 33 and 35 are carried, at the opposite end of pan cover 20, on sprockets 37 rotatably mounted on an idler shaft 38 whose bearings are supported by an attachment bracket 39. The lower runs of the chains 33 and 35 pass beneath and follow the contour of pan cover 20 by reason of idler sprockets 40 which project from above through slots in the pan cover at the juncture of the horizontal and inclined end portions thereof; such sprockets 40 being carried on cross shafts 41 journaled atop said pan cover 20.

In order to provide lengthwise rigidity of the cooking tunnel and conveyor structure, a vertically disposed plate 42 extends from end to end thereof between and separating the conveyor assemblies; said plate being supported by the shaft section 32 at one end and by shaft 38 at the other end.

Both of the conveyor assemblies are fitted with circumferentially spaced, transverse and outwardly projecting pusher plates or paddles 43 which are of a size and configuration to pass through the cooking tunnel on corresponding sides of division plate 18 and with small clearance, as is clearly shown in Fig. 5. The conveyor assemblies are driven in the direction of the arrow in Fig. 2.

The separate conveyor assemblies are driven at selectively controlled speeds, and independently of each other, in the following manner:

Separate reduction gear boxes 44 are disposed beneath partition 5 in housing chamber 7; each gear box being mounted on a base 45 supported for longitudinal sliding movement and actuated by a screw shaft 46, which extends through the adjacent end of the housing and is fitted with a hand wheel 47. The drive pinions 48 of the gear boxes are in vertical alinement with and drive sprockets 30 and 31 through endless chains 49.

An electric motor having a double ended shaft 51 fitted with drive pulleys 52 is disposed in chamber 7 ahead of the gear boxes 44; the gear box pulleys 53 being driven from the motor pulleys by endless V belts 54. The pulleys 53 are of the expanding flange type, such as manufactured by Reeves Pulley Co., and are operative upon sliding of the gear boxes to vary in diameter and thus effect a change in their speed ratio relative to motor pulleys 52.

Upstanding pointers 55 are mounted on the gear boxes 44 and extend to, and are readable on, separate calibrated scales 56 on the exterior of the housing on one side thereof. It will be seen that as the gear boxes are adjusted one way or the other, there will be a change in the speed of the conveyor assemblies driven therefrom and the time required for food to pass through the cooking tunnel; scales 56 being calibrated to indicate such time.

The hot grease or cooking oil is maintained in the reservoir 8 to a certain level L, but can be drained when necessary through a bottom outlet 57; a horizontal swing spout 58 leading from this opening from below. The spout is normally enclosed within the housing chamber 7, but swingable through the side opening thereof when a removable panel 59 thereon is detached.

A removable vented hood 60 extends between the upper ends of side walls 3 and 4 and overlies the apparatus from end to end in spaced relation above the upper runs of the conveyor assemblies; there being a hinged end portion 61 on said hood above platform 13.

*Operation*

In use, the tank or reservoir 8 is filled with the cooking oil or grease to a predetermined level L, and the heating units 10 are energized, in order to heat the oil to the desired and thermostatically regulated cooking temperature.

When the oil reaches such temperature, the motor 50 is started, and hand wheels 47 adjusted so that the gear cases 44 are moved to a position whereby the automatically adjustable pulleys 53 are effecting a drive of the conveyor mechanisms each at a selected speed, and which will be indicated by the pointers 55 reading on scales 56.

The food to be cooked is disposed on platform 13; different types of food—as for example chicken and potatoes—being disposed on opposite sides of the division plate 16. The foods, as orders are conveyed to the chef, are fed in the desired quantity from the platform down the corresponding side of the feed incline 11 whereupon they are immediately picked up by one of the pusher plates or paddles 43 of the corresponding conveyor. The foods are thence conveyed in separated relation down such incline, along the perforate bottom pan 17, and finally up the drain incline 12 from which they are discharged into chute 14. From the chute, the cooked goods fall into a suitable receptacle.

The cooking of the foods is effected while they are submerged in the heated oil and while being advanced through the cooking tunnel by the previously described conveyor mechanisms; a substantial portion of the length of the cooking tunnel being submerged below the surface of the oil in the reservoir. It will be seen that by virtue of the fact that the separate conveyor mechanisms can be driven at different and selectively regulated speeds, the different foods can be passed through the cooking tunnel at different and selectively regulated speeds. By virtue of this fact, each type of food is cooked the correct length of time.

At intervals it is desirable to clean the cooking tunnel and conveyor mechanism. This is accomplished by first swinging such tunnel and mechanism assembly upward about shafts 27 and 28 as an axis in the manner shown in Fig. 3; the hood 59 first having been removed. Thereafter, the draw bolts 22 are released and the bottom pan 17 is dropped away and removed, the remainder of the cooking tunnel then being readily accessible for cleaning.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a continuous food cooker which includes an initially open topped tank adapted to contain heating cooking oil to a predetermined level, and a driven endless and flexible food advancing unit disposed with one reach thereof in the tank below said level; a tunnel assembly normally disposed in the tank mainly below said level and through which tunnel assembly said reach extends, said assembly including in normally stationary relation to the tank an elongated cover pan extending lengthwise and above said reach, a perforate elongated bottom pan extending lengthwise and below said reach but above the bottom of the tank, and side plates extending between corresponding edges of said pans in unitary relation thereto.

2. In a continuous food cooker which includes an initially open topped tank adapted to contain heating cooking oil to a predetermined level, and a driven endless and flexible food advancing unit disposed with one reach thereof in the tank below said level; a tunnel assembly normally disposed in the tank mainly below said level and through which tunnel assembly said reach extends, said assembly including in normally stationary relation to the tank an elongated cover pan extending lengthwise and above said reach, a perforate elongated bottom pan extending lengthwise and below said reach but above the bottom of the tank, side plates extending between corresponding edges of said pans in unitary relation thereto, and a plurality of pusher plates fixed on said flexible unit in spaced relation longitudinally of the latter, said pusher plates extending transversely of said tunnel assembly with their edges in close relation to the corresponding interior walls thereof.

3. In a continuous food cooker which includes an initially open topped tank adapted to contain heating cooking oil to a predetermined level, and a driven endless and flexible food advancing unit disposed with one reach thereof in the tank below said level; a tunnel assembly normally disposed in the tank mainly below said level and through which tunnel assembly said reach extends, said assembly including in normally stationary relation to the tank an elongated cover pan extending lengthwise and above said reach, a perforate elongated bottom pan extending lengthwise and below said reach but above the bottom of the tank, and side plates extending between corresponding edges of said pans in unitary relation thereto, said tunnel assembly and endless unit being mounted for movement as a unit clear of said oil level, and said bottom pan being detachable from the remainder of the tunnel assembly.

4. A continuous cooker as in claim 3 in which the cover pan and side plates extend at opposite ends some distance beyond the bottom pan and at an upward and outward incline to points above said oil level; the tank having upwardly and outwardly inclined end portions forming, when the tunnel assembly is in normal position, continuations of said bottom pan which extend the width and length of said extended portions of the cover plate.

5. A continuous cooker as in claim 1 in which said flexible food advancing unit includes a pair of transversely spaced conveyor assemblies, one reach of each of which passes through the tunnel assembly, a division plate extending through the tunnel assembly between said reaches, a single drive motor, and separate drive connections between the motor and said conveyor assemblies.

6. A continuous cooker as in claim 1 in which said flexible food advancing unit includes a pair of transversely spaced conveyor assemblies, one reach of each of which passes through the tunnel assembly, a division plate extending through the tunnel assembly between said reaches, a single drive motor, and separate drive connections between the motor and said conveyor assemblies, said connections each including a separate variable speed regulator whereby the conveyor assemblies may be driven at different speeds.

7. Food cooking apparatus comprising an initially open topped tank adapted to receive cooking oil to a predetermined depth, means to heat the oil, a movable cooking tunnel assembly normally disposed in the tank, only the ends of the tunnel being above said level, a pair of endless conveyors mounted on the tunnel assembly in transversely spaced relation, the lower runs of said conveyors passing through the tunnel, separate axially alined drive shafts for the conveyors journaled transversely on said assembly at one end thereof and being supported therebeyond, adjacent ends of said shafts being spaced and a short shaft section engaged therebetween, certain of the journals for said drive shafts supporting said short shaft section at its ends, a transverse idler shaft at the other end of the assembly, and a division plate in the tunnel between said conveyors supported at its ends by said short shaft section and said idler shaft respectively.

8. Food cooking apparatus including a tank adapted to receive heated cooking oil, a cooking tunnel assembly disposed in the tank mainly below said level, an endless conveyor having one reach passing through the tunnel, and means to drive said conveyor; said means including an expanding flange pulley, a shaft on which said pulley is fixed, a drive motor including a drive pulley, an endless belt extending between the expanding flange pulley and said drive pulley, and means mounting said shaft and motor for movement to and from each other; the apparatus being enclosed in a housing and said mounting means including a screw shaft projecting through said housing, and a hand wheel on the outer end of said screw shaft.

9. Food cooking apparatus including a tank adapted to receive heated cooking oil, a cooking tunnel assembly disposed in the tank mainly below said level, said tunnel assembly being divided into separate longitudinal passages, an endless conveyor assembly including a pair of separate endless flexible conveyor units, one reach of said units extending through said passages, a single drive motor, and separate drive connections between the motor and each of said conveyor units, said connections each including a separate variable speed regulator whereby the conveyor units may be driven at different speeds.

WALTER R. SCHARSCH.